(12) United States Patent
Kim et al.

(10) Patent No.: US 8,431,187 B2
(45) Date of Patent: Apr. 30, 2013

(54) MANUFACTURING METHOD OF FILTER MEDIA AVAILABLE AT MEDIUM AND HIGH TEMPERATURE EXHAUST GAS USING FOAM COATING TECHNOLOGY AND FILTER MEDIA MANUFACTURED THEREBY

(75) Inventors: Gyung Soo Kim, Yongin-si (KR); Sang Bum Kim, Dongdaemun-gu (KR); Myong-Hwa Lee, Cheonan-si (KR); Young-Chun Kim, Gangseo-gu (KR); Seung Je Lee, Uijeongbu-si (KR); Byung Hyun Park, Hwaseong-si (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 682 days.

(21) Appl. No.: 12/306,212

(22) PCT Filed: Dec. 28, 2007

(86) PCT No.: PCT/KR2007/006978
§ 371 (c)(1),
(2), (4) Date: Dec. 22, 2008

(87) PCT Pub. No.: WO2008/082210
PCT Pub. Date: Jul. 10, 2008

(65) Prior Publication Data
US 2009/0199528 A1    Aug. 13, 2009

(30) Foreign Application Priority Data
Dec. 28, 2006 (KR) .................. 10-2006-0136943

(51) Int. Cl.
*B01D 39/20* (2006.01)
(52) U.S. Cl.
USPC ............ 427/244; 55/522; 55/527; 55/DIG. 5; 55/DIG. 42; 427/389.7; 427/369; 264/42; 264/628

(58) Field of Classification Search ............... 514/1–8.1, 514/10–19; 55/522–528, DIG. 13, DIG. 42, 55/DIG. 5; 427/243–247, 355, 359–360, 427/365–366, 369–370, 372.2–374.1, 384, 427/385.5, 389.7–389.8, 393.4; 428/304.4–319.9
See application file for complete search history.

(56) References Cited

U.S. PATENT DOCUMENTS 3,574,646 A    4/1971  Wismer et al.
3,669,823 A *  6/1972  Wood ........................... 442/333
(Continued)

FOREIGN PATENT DOCUMENTS

JP    H03-505850      12/1991
JP    2001-240691 A    9/2001
(Continued)

OTHER PUBLICATIONS

China Patent Office Action issued Aug. 4, 2010 to China Application No. 200780024315.8.
(Continued)

*Primary Examiner* — Duane Smith
*Assistant Examiner* — Thomas McKenzie
(74) *Attorney, Agent, or Firm* — Koppel, Patrick, Heybl & Philpott

(57) ABSTRACT

Disclosed herein is a method of producing a filter medium for treating medium and high temperature exhaust gas using foam coating and a filter medium produced using the method. The filter medium has excellent heat resistance and heat contraction resistance, and exhibits partial dust collection efficiency of 99% or more by weight, total dust collection efficiency of 99.999% or more by weight, and high dust removal efficiency, for all dust particle sizes. Further, the filter media can be efficiently used to treat medium and high temperature exhaust gas because pores having an average pore size of 30 µm or less are uniformly distributed on the surface of the filter media.

6 Claims, 6 Drawing Sheets

U.S. PATENT DOCUMENTS

| | | | | |
|---|---|---|---|---|
| 3,954,662 | A * | 5/1976 | Salyer et al. | 252/88.1 |
| 4,361,284 | A * | 11/1982 | Kalbskopf et al. | 239/422 |
| 4,885,326 | A * | 12/1989 | Haruna et al. | 524/291 |
| 5,096,616 | A * | 3/1992 | Kittle | 516/14 |
| 5,194,322 | A * | 3/1993 | Doran | 442/77 |
| 6,036,735 | A * | 3/2000 | Carter et al. | 55/341.1 |
| 2003/0084788 | A1* | 5/2003 | Fraser, Jr. | 95/285 |
| 2003/0140794 | A1* | 7/2003 | Wang et al. | 96/226 |
| 2005/0050869 | A1* | 3/2005 | Haes | 55/497 |

FOREIGN PATENT DOCUMENTS

| | | |
|---|---|---|
| KR | 10-2000-0067428 | 11/2000 |
| KR | 10-2001-0112808 | 12/2001 |
| KR | 10-2002-0001178 | 1/2002 |
| KR | 10-2002-0022343 | 3/2002 |
| KR | 1020030067561 A | 8/2003 |
| KR | 10-0450983 | 2/2004 |
| KR | 10-2004-0049278 | 6/2004 |
| KR | 10-2004-0049279 | 6/2004 |
| KR | 10-2005-0119857 | 12/2005 |
| KR | 10-2006-0000170 | 1/2006 |
| WO | WO89/12135 | 12/1989 |

OTHER PUBLICATIONS

Office Action issued Jun. 22, 2010 to Japan Patent Application No. 2009-516414.

International Search Report and Written Opinion with references cited in International Application No. PCT/KR2007/006978, mailed Apr. 17, 2008.

European Patent Office, Extended European Search Report (ESSR) for EP Application No. 07860755.3-2113/2097153 based on PCT/KR2007/006978, dated May 30, 2012.

"Eriks Sealing Elements—Viton Fluorelastomers", Publication No. 054406, 2000, pp. 1-32.

* cited by examiner

Fig. 7
(a) Before the heat resistance test
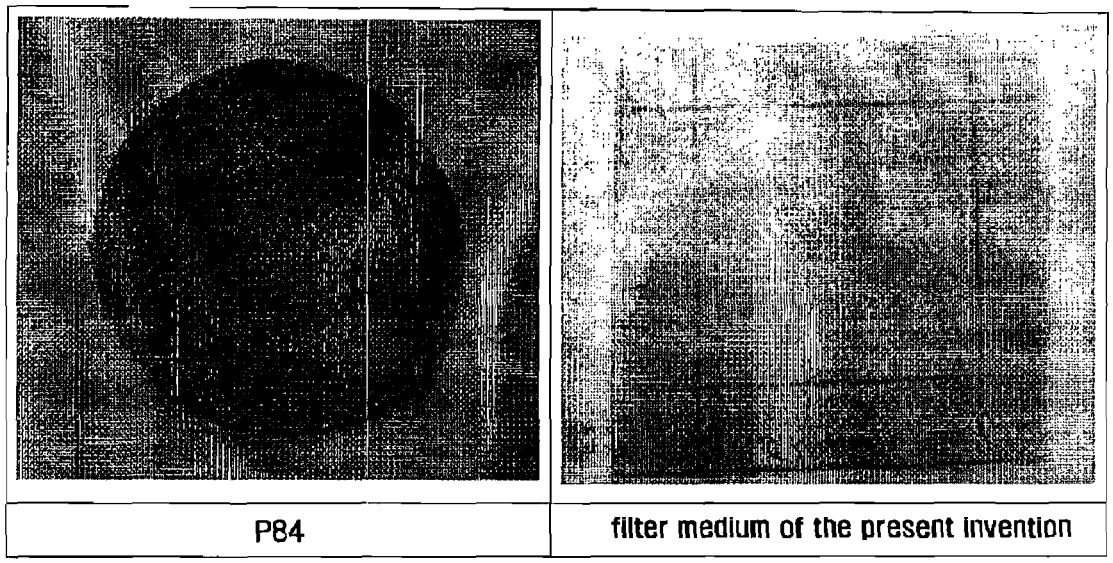
(b) After the heat resistance test
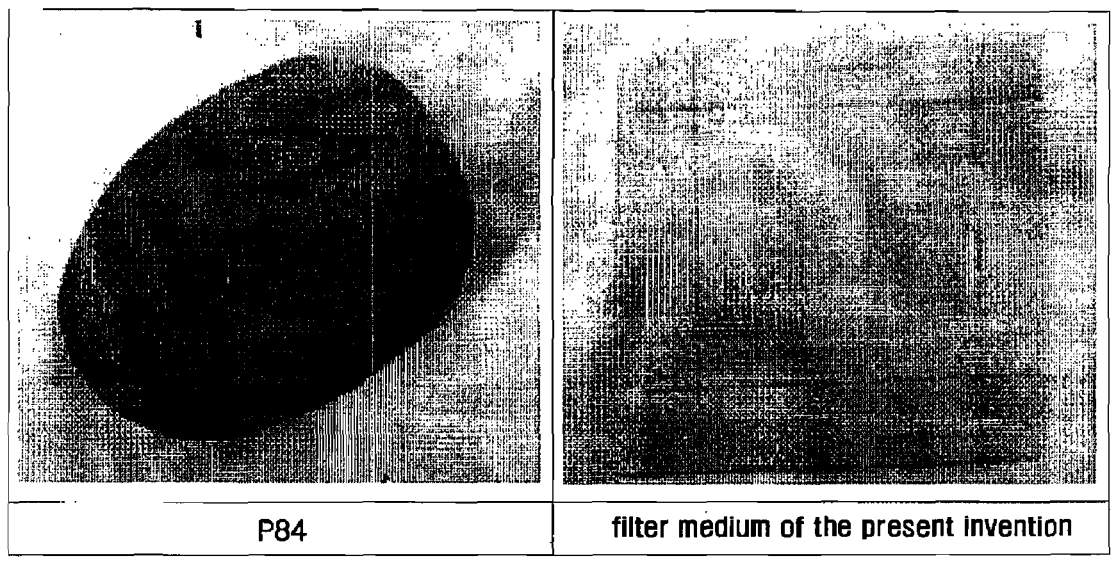

MANUFACTURING METHOD OF FILTER MEDIA AVAILABLE AT MEDIUM AND HIGH TEMPERATURE EXHAUST GAS USING FOAM COATING TECHNOLOGY AND FILTER MEDIA MANUFACTURED THEREBY

TECHNICAL FIELD

The present invention relates to a method of producing a filter medium for treating medium and high temperature exhaust gas using a foam coating method and a filter medium produced using the method.

BACKGROUND ART

Since dust, causing air pollution, is discharged in combustion processes of industrial fields and thus adversely affects the atmospheric environment, many efforts to treat and control the dust are being made. Since filter dust collectors, used to remove such fine dust, exhibit very high dust collection performance regardless of the kind of dust or working conditions, most conventional electrostatic precipitators are being replaced by filter dust collectors. However, when conventional filter media for dust collection are directly applied to filter dust collectors at a high temperature of 250° C. or more in a state in which they are badly worn, problems may occur. Therefore, various alternatives for solving the problems are being researched.

For example, there is research on the use of an additional filtration effect due to the formation of a dust layer. This research is conducted based on the fact that, during the filtration of fine dust, solid particles are continuously deposited on a filter medium to form a dust cake layer, and the formed dust layer serves a layer for collecting other particles, thus obtaining an additional filtration effect. That is, after the initial dust layer is formed, as filtration continues, the filtration effect due to the dust layer, rather than the filtration effect due to the peculiar characteristics of the filter media, occurs. In this case, ultimately, the dust layer itself controls dust filtration performance, and the dust filtration performance is influenced by the structure of the filter media, the characteristics of dust (size, morphology, interaction between particles, etc.), filtration conditions (face velocity, dust concentration, operating temperature, etc.). In particular, since the surface structure and pore size of the filter media determines the characteristics of the initial dust layer, and the initial dust layer forms a subsequent dust layer and influences the filtration mechanism as filtration continues, the initial structure of the filter media ultimately controls the dust filtration characteristics. However, research on the formation of the dust layer has mostly been limited to fibrous filter media, and is intermittently conducted. In the case of inorganic filter media for purifying high-temperature exhaust gas, since they are manufactured, using special materials through special methods such that the form and properties thereof do not change, the structures of filter media differ from each other, and thus research on the formation of dust suitable for the structure difference is required.

Generally, the filter medium that has been applied to dust collection to date is a depth filtration type filter medium. However, this depth filtration type filter medium is problematic in that, since fine dust infiltrates into the filter medium, pressure drop increases, dust collection efficiency decreases, and the life span of the filter medium decreases. Therefore, currently, advanced countries are attempting to improve dust collection efficiency and dust removal efficiency and to increase the life span of filter media using a surface filtration method, which is a method of preventing fine dust from infiltrating into a filter medium by forming a porous surface layer on the filter medium.

Currently, methods of forming a porous surface layer include a coating method and a laminating method. The coating method includes foam (bubble) coating, aerosol coating, and electric coating. The laminating method includes film laminating and web layer laminating. Among the methods, the coating method is being mainly used as a method of maximizing the porosity of the surface of a filter medium. The reason is that the coating method has fewer technical restrictions than the lamination method. In particular, the foam coating is advantageous in that dust can be significantly removed because a surface layer is formed on the surface of a filter medium, and a large number of filter media can be produced in a process of manufacturing filter media. Further, the foaming coating is advantageous in that process chemicals are widely distributed on the surface of a filter medium, and are thus easily dispersed thereon because of the volume increase caused by foam. In addition, foam coating has advantages in that the amount of water that is used is decreased, the amount of wastewater that is discharged is decreased, the amount of process chemicals that are used is decreased, and productivity is improved. Therefore, foam coating is expected to be widely applied.

As points to be considered in foam coating, there are the structure, composition, weight, pretreatment of fabric, and properties of foam, such as viscosity, half-value period, rupture degree, absorbance of rupture foam, etc. It is possible to select suitable process conditions by making changes thereto. However, in foaming coating, a large amount of energy is consumed to vaporize water in a drying process after a wet process. Therefore, research on methods of reducing energy consumption in the drying process is required.

Conventional technologies using foam coating are described as follows.

Korean Patent No. 10-1992-9561 discloses a nonwoven fabric wallpaper and a method of producing the same, and discloses a method of producing a hygroscopic waterproof fabric by forming an adhesion layer, a micropore layer and a water repellent layer on one surface of spun and knit fabric; Korean Patent No. 10-2000-67428 discloses an air filter produced by coating surface of a nonwoven fabric with a resin foam obtained by air-blowing an emulsion obtained by uniformly mixing an emulsifier, such as an acrylic resin, an urethane resin, a polytetrafluoroethylene resin, a silicon resin, or the like, which is a water-soluble resin selected from low polymerized synthetic resins, with an acrylic thickener, a foaming agent, a foam stabilizer, a surfactant, an inorganic filler, active coal having a particle size of 100 mesh or less, zeolite having a particle size of 100 mesh or less and a cross-linking agent and then drying the nonwoven fabric coated with the resin foam; and Korean Patent No. 10-0367561 discloses a filter for filtrating fine dust, produced by coating a glass fiber fabric with a resin foam obtained by air-blowing an emulsion formed by uniformly mixing a water-soluble resin with an acrylic thickener, a foaming agent, a foam stabilizer, a surfactant, an inorganic filler and a cross-linking agent, and then drying the glass fiber fabric coated with the resin foam, and a method of producing the same. However, the above methods are advantageous in that a surface layer is easily formed on a filter medium, but are problematic in that, since an acrylic resin is used, thermal stability is not good, and thus fine dust included in medium and high temperature exhaust gas of 250° C. or more cannot be removed.

Accordingly, in order to improve thermal stability, Korean Patent No. 10-0367561 discloses a functional nonwoven fabric wallpaper, which has excellent flameproof and antibiotic properties and can maintain functionality semi-permanently, produced by applying a chemical foam coating agent, in which a flame retardant and an antibiotic are mixed, on the rear surface of a piece of nonwoven fabric using a foaming coating method, and a producing method thereof; Korean Patent Publication No. 10-2004-49278 discloses a ceramic filter produced by mixing at least one ceramic powder, selected from the group consisting of silicon carbide, alumina, sillimanite, kaolin, silica, titania and diatomite, with clay, a pore forming agent, a binder and a dispersant to prepare a slurry, supporting the slurry on a support to form a molded product, and then drying and sintering the molded product, and a producing method thereof; and Korean Patent No. 10-2004-49279 discloses a method of producing a multi-layered ceramic filter, comprising the steps of mixing at least one ceramic powder, selected from the group consisting of silicon carbide, alumina, sillimanite, kaolin, silica, titania and diatomite, with clay, a pore forming agent, a binder and a dispersant to prepare a slurry, supporting the slurry on a support to form a molded product, drying and sintering the molded product, applying an additional slurry, in which ceramic powder, a pore forming agent, a binder and a dispersant are mixed, on the interior or exterior portion of the molded product, and further drying and sintering the molded product, and a ceramic filter produced using the method. However, the above methods are disadvantageous in that, although thermal stability can be ensured, energy consumption at a heating temperature of 900~1,300° C. in a sintering process is increased, and the dust removal efficiency of these methods is lower than that of foam coating. Meanwhile, Korean Unexamined Patent Publication No. 10-2002-22343 discloses a filter, which is mounted in an exhaust gas pipe located at the rear end of a diesel engine and serves to decrease the amount of particles discharged from the diesel engine, and in which a pad type filter medium is mounted in a quadrangular tube, and the circumference thereof is fixed with a net. However, this filter is also disadvantageous in that it is not flexible, and has low dust removal efficiency.

DISCLOSURE OF THE INVENTION

Technical Problem

The present inventors have researched filter media having high thermal stability and dust removal efficiency, and have found that a filter medium, produced by forming a microporous surface layer on the surface of an inorganic fiber support using foam coating, increases dust collection efficiency and dust removal efficiency at medium and high temperature of 250-300° C. has high heat resistance, and maximizes the surface filtration effect because pores having an average pore size of 30 μm or less are uniformly distributed on the surface of the filter media, and have completed the present invention on that basis.

Technical Solution

The present invention provides a method of producing a filter medium for treating medium and high temperature exhaust gas using a foam coating method and a filter medium produced using the method.

Advantageous Effects

The filter medium according to the present invention, compared to conventional filter media, has excellent heat resistance and heat contraction resistance, and exhibits a partial dust collection efficiency of 99% or more by weight, a total dust collection efficiency of 99.999% or more by weight, and high dust removal efficiency, for all dust particle sizes. Further, the filter medium can be efficiently used to treat medium and high temperature exhaust gas because pores having an average pore size of 30 μm or less are uniformly distributed on the surface of the filter medium.

BRIEF DESCRIPTION OF DRAWINGS

FIG. 7 is photographs showing the change in the shape of the filter medium of the present invention before and after a heat resistance test.

Figure 1:
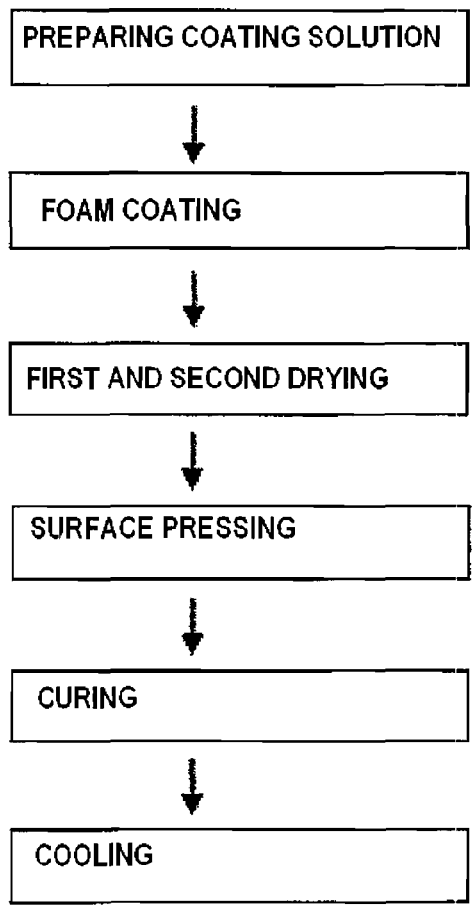
FIG. 1 is a flow chart showing a method of producing a filter medium for treating medium and high temperature exhaust gas using a foam coating method according to the present invention.

| <Description of the elements in the drawings> | |
|---|---|
| 1 | foam generator |
| 2 | stirrer |
| 3 | foam solution supply pump |
| 4 | foam solution supply pipe |
| 5 | glass fiber fabric |
| 6 | foam solution |
| 7 | blade |
| 8 | first dry oven |
| 9 | second dry oven |
| 10 | thermal press |
| 11 | curing oven |
| 12 | cooler |
| 13 | unwinder |
| 14 | conveyor belt |
| 15 | winder |
| 16 | glass fiber fabric coated with foam solution |
| 17 | dried glass fiber fabric |
| 18 | glass fiber fabric pressed with coating layer |
| 19 | produced glass fiber fabric. |

BEST MODE FOR CARRYING OUT THE INVENTION

The present invention provides a method of producing a filter medium for treating medium and high temperature exhaust gas using foam coating, including:

1) mixing a heat resistant water-soluble resin, a foam stabilizer, a foaming agent and a thickener to prepare a coating solution;

2) treating the coating solution using a foam generator to form a foam solution, and then applying the foam solution on a surface of an inorganic fiber fabric support;

3) drying the inorganic fiber fabric support coated with the foam solution;

4) pressing the dried inorganic fiber fabric support;

5) heat-treating the pressed inorganic fiber fabric support; and 6) cooling the heat-treated inorganic fiber fabric support.

Further, the present invention provides a filter medium produced by the method.

Hereinafter, the present invention will be described in detail.

In the present invention, the coating solution may be formed by mixing a heat resistant water-soluble resin, a foam stabilizer, a foaming agent and a thickener at a ratio of 1:0.05~0.1:0.01~0.02:0.01~0.05 by weight, and preferably at a ratio of 1:0.07:0.02:0.015 by weight.

The heat resistant water-soluble resin may be a fluoride resin including a fluorine compound, represented by Formula 1 below:

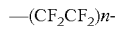 [Formula 1]

wherein n is an integer of 100 to 10,000.

The foam stabilizer serves as a resin foam maintaining agent, and may be any one selected from the group consisting of hydroxyethyl cellulose, carboxymethyl cellulose, and ammonium stearate.

The foaming agent is a foam forming material, and may be an anionic foaming agent including sodium laurate and sodium stearate, or may be a nonionic foaming agent including polyethylene glycol and polyhydric alcohol.

The thickener serves to keep resin foam adhered on a fiber, and may be preferably an acrylic thickener.

In the present invention, the inorganic fiber fabric support may be preferably a commercially available glass fiber.

Hereinafter, a method of producing a filter medium for treating medium and high temperature exhaust gas using foam coating will be described in detail with reference to FIGS. 1 and 2.

Figure 2:
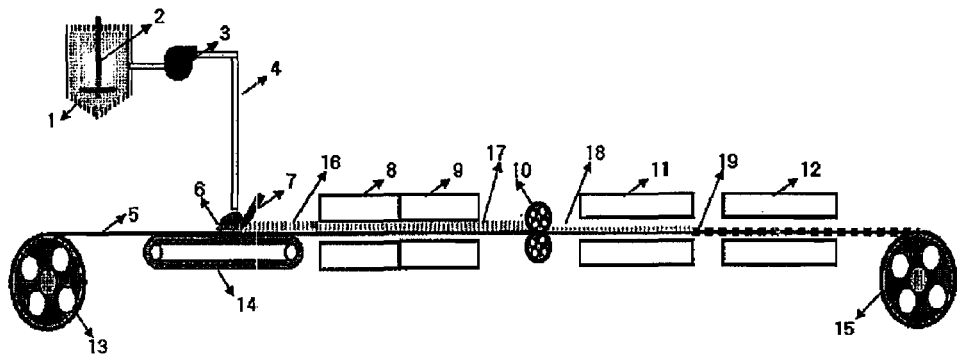
FIG. 2 is a scheme showing a system for conducting the method of producing a filter medium for treating medium and high temperature exhaust gas using a foam coating method according to the present invention.

FIG. 1 is a flow chart showing a method of producing a filter medium for treating medium and high temperature exhaust gas using a foam coating method according to the present invention, and FIG. 2 is a scheme showing a system for conducting the method of producing a filter medium for treating medium and high temperature exhaust gas using a foam coating method according to the present invention.

First, a heat resistant water-soluble resin, a foam stabilizer, a foaming agent and a thickener are mixed at a ratio of 1:0.05~0.1:0.01~0.02:0.01~0.05 by weight, and preferably at a ratio of 1:0.07:0.02:0.015 by weight, and are then stirred at room temperature for 5 minutes to prepare a coating solution. The prepared coating solution is introduced into a foam generator 1 at a feed rate of 600~1350 g/min. In the foam generator 1, while air is quantitatively supplied to the coating solution at a flow rate of 0.5~2 L/min, the coating solution is formed into a foam solution 6 by a stirrer 2 having a rotation speed of 200~400 rpm. The formed foam solution 6 is supplied to a glass fiber fabric 5 by a foam solution supply pump 3. While the glass fiber fabric 5 is transferred from an unwinder 13 to a winder 15 at a constant speed of 1.5~2 m/min, foam coating is conducted. When the glass fiber fabric 5 passes through a conveyor belt 14, the foam solution 6, formed in the foam generator 1, is supplied on the glass fiber fabric 5 through a foam solution supply pipe 4 by the foam solution supply pump.

Meanwhile, the conveyor belt is provided thereon with a knife type blade 7, and the foam solution 6, supplied on the glass fiber fabric 5, is adjusted to have a predetermined thickness, and preferably a thickness of about 0.3 to 1.0 mm, while the glass fiber fabric 5 passes through the blade, thereby forming a glass fiber fabric 16 coated with foam. The glass fiber fabric 16 coated with foam is put into first and second dry ovens 8 and 9 disposed at the rear end of the blade 7 in order to dry and heat-treat the foam solution 6 applied thereon. The first dry oven 8 is maintained at a temperature of 80° C. to 120° C., and the glass fiber fabric 16 coated with foam is left therein for about 2 minutes. Subsequently, the second dry oven 9 is maintained at a temperature of 180° C. to 220° C., and the glass fiber fabric having passed through the first dry oven 8 is left therein for about 2 minutes, thereby forming a dried glass fiber fabric 17 coated with foam. The dried glass fiber fabric 17 coated with foam is put into a press 10 disposed at the rear end of the second dry oven 9 in order to contribute uniformity and stability thereto. The press 10 presses a coating layer at a pressure of 200 psi to 700 psi, preferably 500 psi, thereby forming a glass fiber fabric 18 pressed with the coating layer having a thickness ranging from 0.1 mm to 0.2 mm. The glass fiber fabric 18 pressed with the coating layer is put into a curing oven 11 disposed at the rear end of the press 10 in order to cure the pressed coating layer. The curing oven 11 is maintained at a temperature of 340° C. to 400° C., and the glass fiber fabric 18 pressed with the coating layer is left therein for 1 to 2 minutes to form a glass fiber fabric 19. The formed glass fiber fabric 19 is cooled to room temperature, thereby completing the filter medium of the present invention.

In the method of producing the filter medium of the present invention, a stable microporous surface layer is formed thereon in the first and second drying processes after foam coating, and is formed into an inorganic filter media including a surface layer having high surface strength through a curing process after a press process.

The filter medium according to the present invention, compared to conventional filter media, has excellent heat resistance and heat contraction resistance, and exhibits partial dust collection efficiency of 99% or more by weight, total dust collection efficiency of 99.999% or more by weight, and high dust removal efficiency for all dust particle sizes. Further, pores having an average pore size of 30 μm or less are uniformly distributed on the surface of the filter media. Therefore, the filter media can be efficiently used to treat exhaust gas in the range of medium and high temperatures (250~300° C.)

MODE FOR INVENTION

Hereinafter, a better understanding of the present invention may be obtained through the following examples, which are set forth to illustrate, but are not to be construed as the limit of the present invention.

Example 1

Production of Filter Media 100 g of a fluoride resin (TE3893, Dupont), 7 g of a foam stabilizer (STABIPRET B-STF, Boehme), 2 g of a foaming agent (STABIPRET B-FOB, Boehme) and 1.5 g of a thickener (TT-935, Youngwoo Chempeck) were mixed, and then stirred at room temperature for 5 minutes to prepare a coating solution. The prepared coating solution was introduced into a foam generator at a feed rate of 780 g/min. While the foam generator quantitatively supplied air to the coating solution at a flow rate of 2 L/min, the coating solution was formed into a foam solution by a stirrer having a rotation speed of 350 rpm. In this case, the viscosity of foam in the coating solution was 10000 cps, the blow ratio of the coating solution was 4~5:1, and the shape of a surface layer was good. The resulting foam solution was applied on the surface of a glass fiber fabric by a foam solution supply pump. The surface of the glass fiber fabric coated with the foam solution was adjusted to have a thickness of 0.5 mm using a knife type blade. In this case, the rotation rate of the foam solution supply pump was maintained at 30 rpm, and the transfer rate of the glass fiber fabric was maintained at 2 m/min. After foam coating, the glass fiber fabric was put into a dry oven disposed at the rear end of the blade, and was then heat-treated for 5 minutes. Here, the glass fiber fabric was primarily heated to a temperature of 80° C., was secondarily heated to a temperature of 220° C., and was then left for 5 minutes.

While the dried glass fiber fabric passed through a pressing roll located at the rear end of the dry oven, a uniform and stable surface layer was formed thereon. The pressed glass fiber fabric was left in a curing chamber having an interior temperature of 340° C. for 2 minutes, and was then cooled to room temperature, thereby completing the filter medium of the present invention.

Experimental Example 1

Analysis of Dust Collection Efficiency

In order to analyze the dust collection efficiency of the filter media of the present invention, a test was conducted as follows.

Since the filter media of the present invention was used to collect dust included in the exhaust gas of a heavy oil boiler, the test was conducted in consideration of the characteristics of the exhaust gas of the heavy oil boiler. In the test, the temperature of the exhaust gas was set to 250±10° C., and fine dust, which is characteristic of a heavy oil boiler, was divided into dust having an average particle size of above 10 μm, dust having an average particle size from 2.5 to 10 μm, dust having an average particle size from 1 to 2.5 μm, and dust having an average particle size of 1 μm or less.

Further, the dust collection efficiency of the filter media of the present invention was measured using the method of absorbing dust at a uniform speed by connecting sampling ports to a filtering chamber during a filtering process using a bag filter, and was calculated by comparing the weight of a filter disposed at the rear end of the filtering chamber before filtration with that after filtration. As comparative filter media, a commercially available filter medium, laminated with polytetrafluoroethylene (PTFE) and m-aramid Nomex, were used.

The partial dust collection efficiency of the filter medium of the present invention is given in Table 1, and the dust collection efficiency of the filter medium of the present invention is given in Table 2.

TABLE 1

| Particle size of dust (μm) | Distribution ratio (%) | Partial dust collection efficiency (%) |
|---|---|---|
| ≧10 | 42.8 | 99.99 |
| 2.5~10 | 36.4 | 99.76 |
| 1~2.5 | 12.5 | 99.34 |
| ≦1 | 8.3 | 99.08 |

TABLE 2

| | Nomex | Commercially available filter medium laminated with PTFE | Filter medium of Example 1 |
|---|---|---|---|
| Dust collection efficiency (%) | 99.999 | 99.999 | 99.999 |
| Initial pressure drop (mmH$_2$O) | 2.4 | 12 | 3.9 |
| Residual pressure drop (mmH$_2$O) | 10~15 | 55~65 | 30~40 |

As shown in Table 1, it can be seen that the filter medium of the present invention has a partial dust collection efficiency of 99% or more for all dust particle sizes. Further, it can be seen that the partial dust collection efficiency of the filter medium of the present invention is decreasing as particle size of dust decreases, thus exhibiting typical characteristics of a conventional filter medium for dust collection.

Further, as shown in Table 2, it can be seen that the total dust collection efficiency of the filter medium of the present invention is 99.999%, which is very high.

Experimental Example 2

Analysis of Dust Removal Efficiency

In order to analyze the dust removal efficiency of the filter medium of the present invention, a test was conducted as follows.

For the dust removal efficiency test, a filter medium for a bag filter was fabricated using the filter media prepared in Example 1. As filter media for comparison, a commercially available filter medium laminated with polytetrafluoroethylene (PTFE) and m-aramid Nomex were used. The dust removal test was conducted under the conditions of a filtration velocity of 3 m/min, a dust removal pressure of 4 kg/cm$^2$ and a inlet dust concentration of 5.7 g/m$^3$. Further, the dust removal test was conducted when the pressure drop in a test unit reached 100 mmH$_2$O, same to the condition in heavy oil boiler. The dust removal test was conducted for 4.5 to 8 hours in consideration of the condition of each filter bag.

Figure 3:
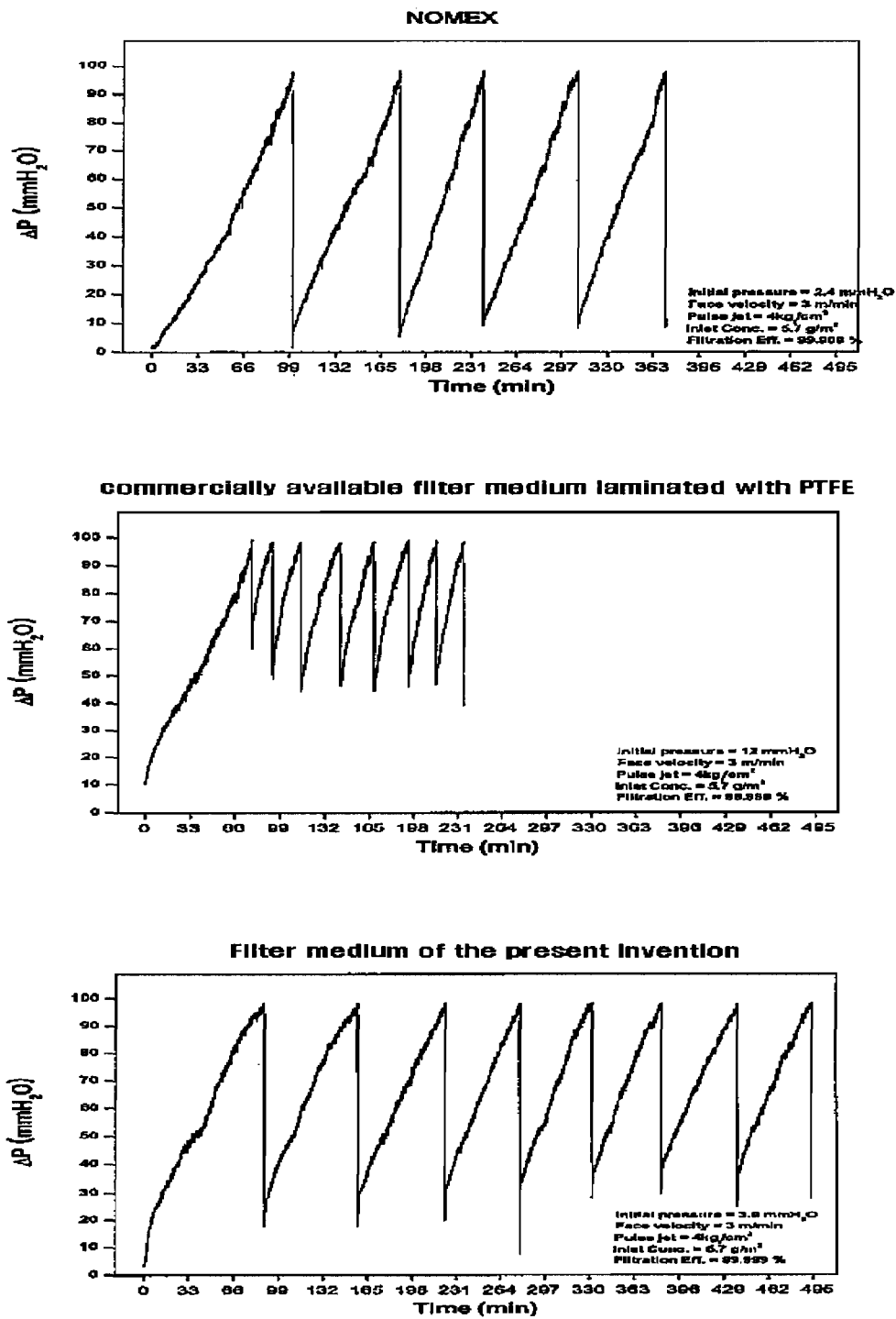
FIG. 3 is graphs showing the dust removal efficiency of a filter medium according to the present invention.

The results thereof are shown in FIG. 3.

As shown in FIG. 3, it can be seen that the dust removal efficiency of the filter medium of the present invention is much higher than that of the commercially available filter medium, and is similar to that of the Nomex filter medium.

Experimental Example 3

Surface Characteristics Test

In order to analyze the surface characteristics of the filter medium of the present invention, the surface of the filter medium prepared in Example 1 was observed by magnifying it 200 times using an optical microscope and by magnifying it 400 times using an electron microscope.

Figure 4:
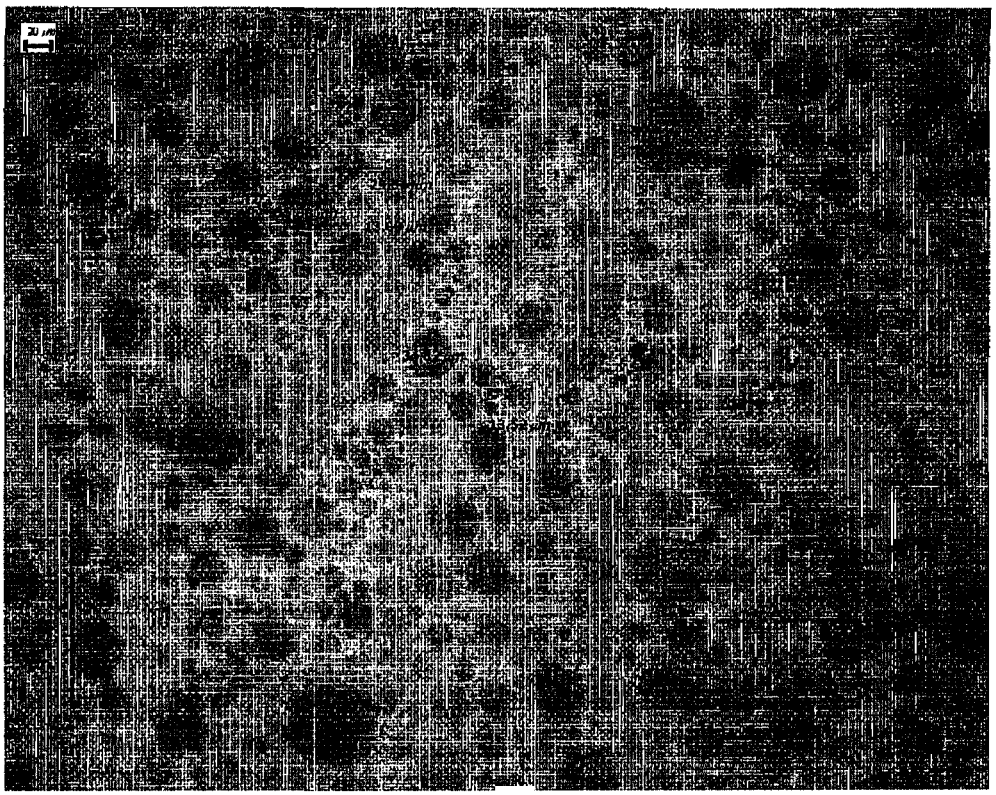
FIG. 4 is a photograph showing the surface of the filter medium of the present invention, magnified 200 times using an optical microscope.
Figure 5:
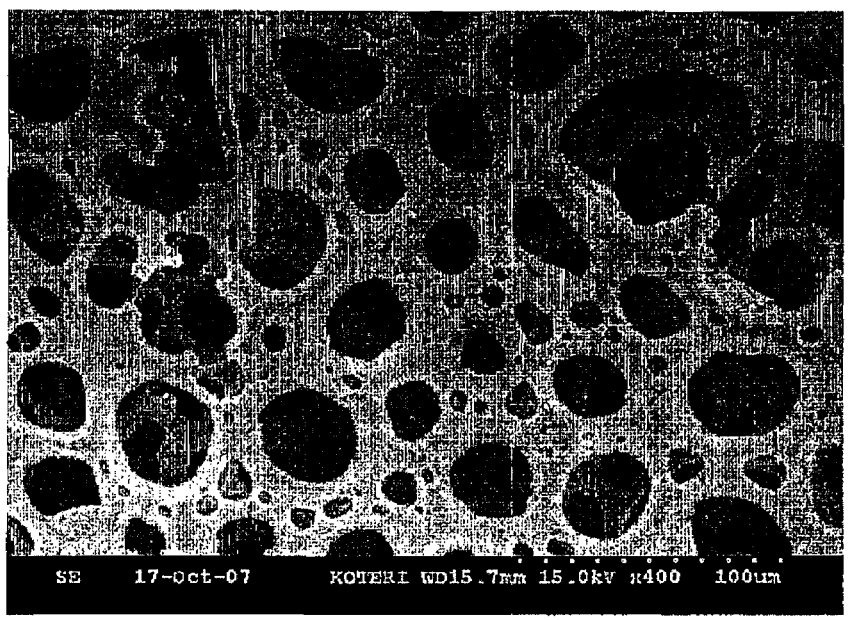
FIG. 5 is a photograph showing the surface of the filter medium of the present invention, magnified 400 times using an electron microscope.

The results of the observation of the surface of the filter media of the present invention by magnifying it 200 times using an optical microscope are shown in FIG. 4, and the results of the observation of the surface of the filter media of the present invention by magnifying it 400 times using an electron microscope are shown in FIG. 5.

As shown in FIG. 4, it can be seen that pores formed through foam coating are distributed on the surface of the filter medium of the present invention. Further, as shown in FIG. 5, it can be seen that a three-dimensional honeycomb structure was also formed in the inner portion of the filter media of the present invention, the same as on the surface thereof.

Experimental Example 4

Observation of Surface Structure of Filter Media Depending on Coating Thickness

In order to observe the surface structure of the filter medium of the present invention depending on coating thickness, a test was conducted as follows.

Filter media were fabricated by adjusting coating thicknesses in the range of 0.0 mm-0.15 mm at the time of surface coating in the preparation of the filter medium of Example 1. Then, the surface structure of the fabricated filter media, depending on the coating thickness of each filter medium, were observed by magnifying them 100 times using an optical microscope.

Figure 6:
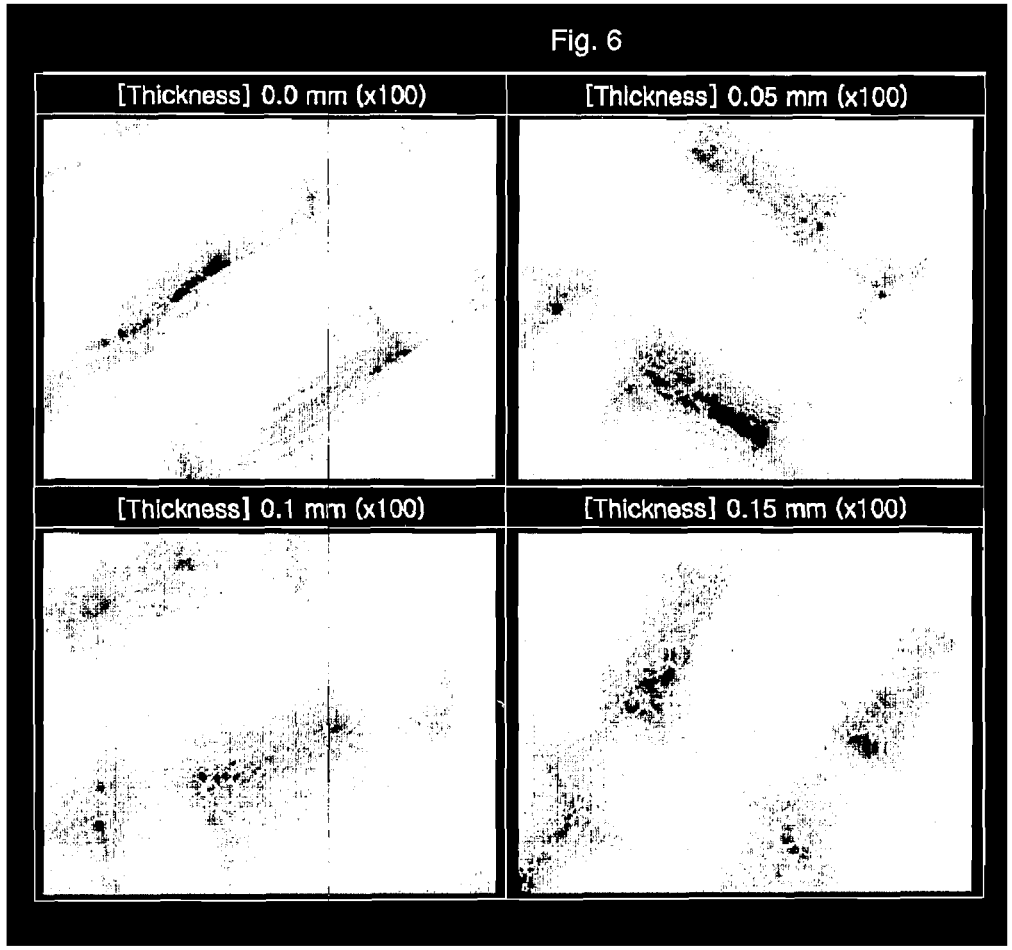
FIG. 6 is photographs showing the surface shape of the filter medium of the present invention depending on coating thickness, magnified 100 times using an optical microscope.

The results thereof are shown in FIG. 6.

As shown in FIG. 6, it can be seen that, when the thickness of the filter media of the present invention is 0.0 mm, the filter media is coated in the form of filling the gap between weft and warp, occurring when a glass fiber fabric is woven. Further, it was found that, when the coating thickness was changed by 0.05 mm, no damage to the filter medium, such as rupture of the surface of the filter medium or the like, was observed, and the entire surface of the filter medium was uniformly coated.

Experimental Example 5

Heat Resistance Test

In order to analyze the heat resistance of the filter medium of the present invention, a test was conducted as follows.

A disk-shaped test piece of the filter medium prepared in Example 1 was marked with a lattice of 5 cm long and 5 cm wide, and was heat-treated in an electric furnace at a temperature of 250° C. for 18 hours, and then the change in the shape of the filter medium before and after the heat treatment was observed.

As a comparative filter medium, polyimide P84, which is the commercially available unwoven fabric-type filter medium having the highest heat resistance at high temperatures, was used.

The change in the shape of the filter medium of the present invention before and after the heat resistance test is shown in FIG. 7.

As shown in FIG. 7, the filter medium of the present invention was not thermally constricted, and was not carbonized. In contrast, the polyimide P84 was thermally constricted to a great extent, and transformed within 1 minute after it was placed in an electric furnace at 250° C., and the surface thereof became rigid.

From the results, it can be seen that the filter media of the present invention has higher heat resistance than commercially available filter media, and is difficult to thermally constrict compared to the commercially available filter media. Therefore, it is determined that the filter media of the present invention can be successfully applied to the treatment of exhaust gas at medium and high temperatures (250~300° C.).

Experimental Example 6

Analysis of Change in Pressure Drop Depending on Face Velocity

In order to analyze the change in the pressure drop of the filter media of the present invention, a test was conducted as follows.

In this test, a filtration performance test device (VDI 3926) was used, and the face velocity was changed within the range of 2~10 m/min. As comparative filter media, a commercially available filter medium laminated with PTFE, m-aramid Nomex, polyphenylsulfide Ryton, Conex, polyimide P84 and a glass fiber were used.

Figure 8:
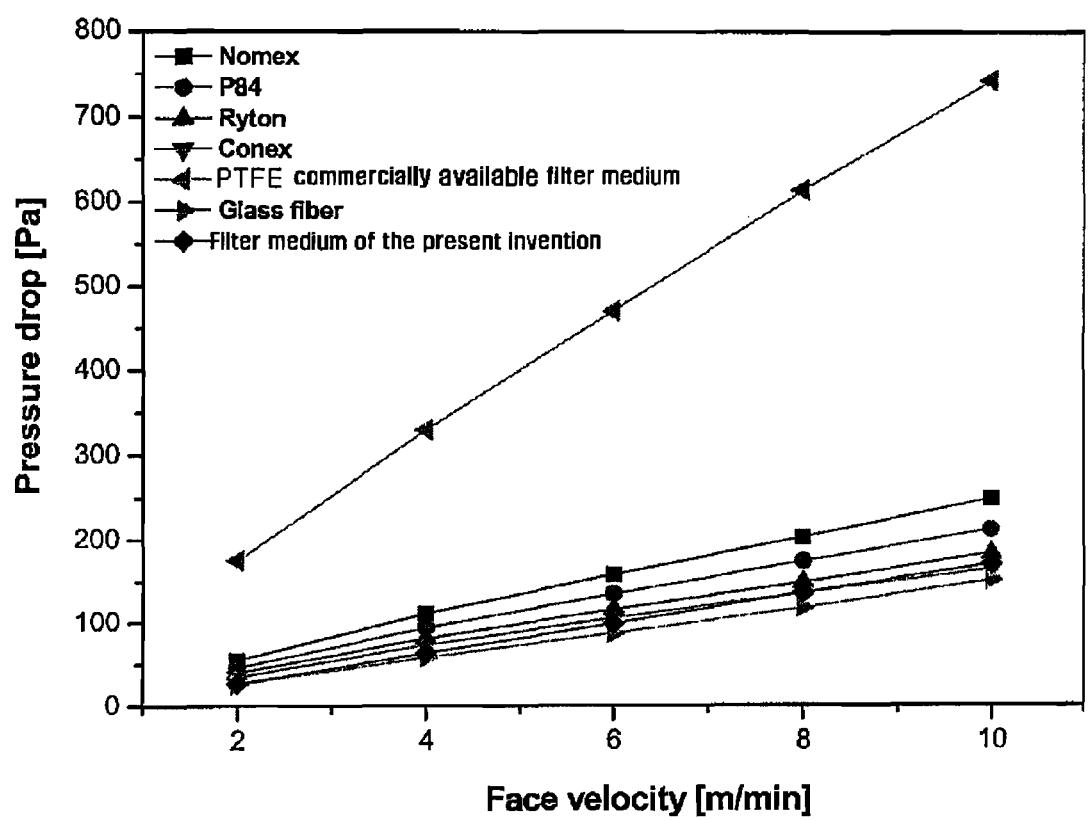
FIG. 8 is a graph showing the change in the differential pressure of the filter medium of the present invention depending on the face velocity thereof.

The results are shown in FIG. 8.

As shown in FIG. 8, it was found that the filter medium of the present invention has far better differential pressure condition than the commercially available filter medium laminated with PTFE, and has porosity similar to those of various unwoven fabric type filter media which are used at low temperatures. Therefore, it can be seen that the filter medium of the present invention can be applied at low temperatures as well as at medium and high temperatures.

INDUSTRIAL APPLICABILITY

The filter medium according to the present invention, compared to conventional filter media, has excellent heat resistance and heat contraction resistance, and exhibits a partial dust collection efficiency of 99% or more by weight, a total dust collection efficiency of 99.999% or more by weight, and high dust removal efficiency, for all dust particle sizes. Further, the filter medium can be efficiently used to treat medium and high temperature exhaust gas because pores having an average pore size of 30 μm or less are uniformly distributed on the surface of the filter medium.

The invention claimed is:

1. A method of producing a filter medium for treating medium and high temperature exhaust gas using foam coating, comprising:
    1) mixing a heat resistant water-soluble resin, a foam stabilizer, a foaming agent and a thickener at a ratio of 1:0.05~0.1:0.01~0.02:0.01~0.05 by weight to prepare a coating solution;
    2) treating the coating solution using a foam generator to prepare a foam solution, and then applying the foam solution on a surface of an inorganic fiber fabric support;
    3) drying the inorganic fiber fabric support coated with the foam solution;
    4) pressing the dried inorganic fiber fabric support at a pressure from 200 psi to 700 psi;
    5) heat-treating the pressed inorganic fiber fabric support at a temperature from 340° C. to 400° C.; and
    6) cooling the heat-treated inorganic fiber fabric support, wherein the heat resistant water-soluble resin is represented by the formula $(CF_2CF_2)_n$, wherein n is an integer from 100 to 10,000.

2. The method of producing a filter medium according to claim 1, wherein the foam stabilizer is any one selected from the group consisting of hydroxyethyl cellulose, carboxymethyl cellulose, and ammonium stearate.

3. The method of producing a filter medium according to claim 1, wherein the foaming agent is an anionic foaming agent including sodium laurate and sodium stearate, or is a nonionic foaming agent including polyethylene glycol and polyhydric alcohol.

4. The method of producing a filter medium according to claim 1, wherein the thickener is an acrylic thickener.

5. The method of producing a filter medium according to claim 1, wherein the inorganic fiber fabric support is a glass fiber.

6. The method of producing a filter medium according to claim 1, wherein, in step 3), the inorganic fiber fabric support is dried at a temperature from 80° C. to 120° C., and is then dried at a temperature from 180° C. to 220° C.

\* \* \* \* \*